No. 634,761. Patented Oct. 10, 1899.
C. J. MOORE.
CHEESE CURD AERATOR.
(Application filed June 8, 1899.)
(No Model.)

WITNESSES:

INVENTOR
Charles J. Moore
BY
ATTORNEYS

UNITED STATES PATENT OFFICE.

CHARLES J. MOORE, OF DEER CREEK, MINNESOTA.

CHEESE-CURD AERATOR.

SPECIFICATION forming part of Letters Patent No. 634,761, dated October 10, 1899.

Application filed June 8, 1899. Serial No. 719,829. (No model.)

*To all whom it may concern:*

Be it known that I, CHARLES J. MOORE, of Deer Creek, in the county of Ottertail and State of Minnesota, have invented a new and Improved Cheese-Curd Aerator, of which the following is a full, clear, and exact description.

This invention relates to devices for aerating cheese-curd.

It is well understood that in warm weather it is difficult to cool cheese-curd to the proper temperature for pressing.

The object of my invention therefore is to provide a simple device by means of which curd may be rapidly cooled to the proper temperature and also to remove all poisonous taints and gases that may be in the curd, thus improving the quality and flavor of the cheese.

I will describe a cheese-curd aerator embodying my invention and then point out the novel features in the appended claims.

Reference is to be had to the accompanying drawings, forming a part of this specification, in which similar characters of reference indicate corresponding parts in all the figures.

Figure 1:
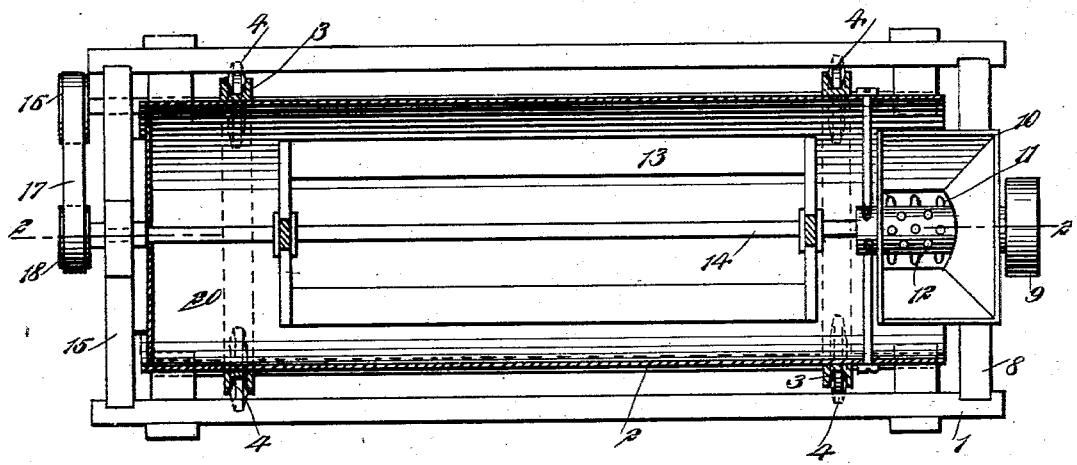
Figure 2:
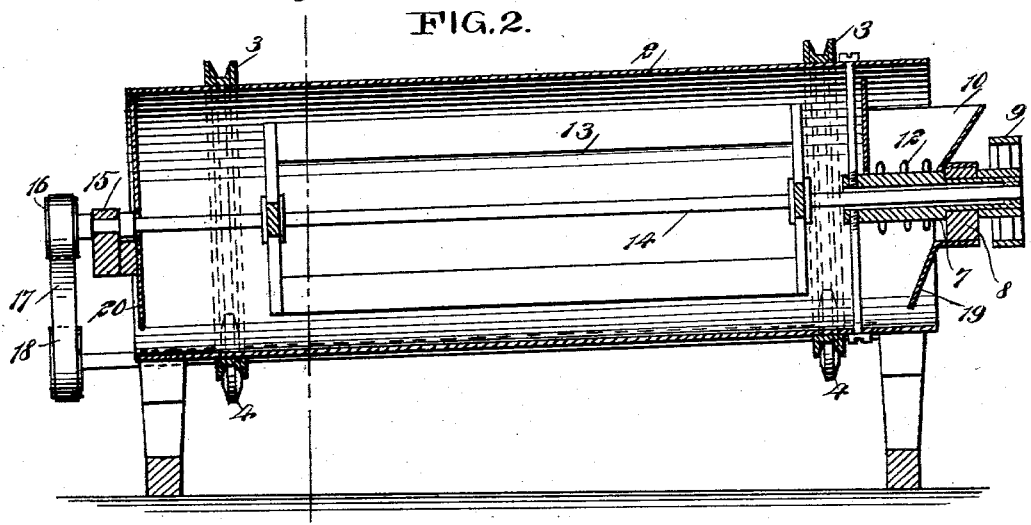
Figure 3:
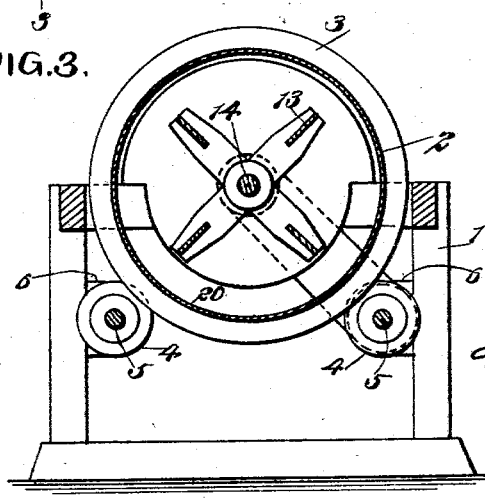

Figure 1 is a partial plan and partial section of a curd-aerator embodying my invention. Fig. 2 is a section on the line 2 2 of Fig. 1, and Fig. 3 is a section on the line 3 3 of Fig. 2.

Referring to the drawings, 1 designates a frame, here shown as rectangular in form and constructed of any suitable material. Mounted to rotate in the frame 1 is a cylinder 2, which is inclined from its feed to its outlet end. Mounted on the cylinder 2 are channel-bands 3, in the channels of which rollers 4 engage, the rollers being mounted on shafts 5, having bearings in brackets 6, secured to the end uprights of the frame. At one end the cylinder 2 is connected by a spider or spoke connection with a tubular shaft 7, which has bearings in a cross-piece 8 of the frame, and on the outer end of this tubular shaft is a band-wheel 9, to which power may be imparted by any suitable means. Connected to the cross-piece 8 is a hopper 10, having openings 11 in its bottom. The tubular shaft 7 is provided with fingers or projections 12 for agitating the curd in the hopper and forcing it through the openings 11.

Mounted to rotate in the cylinder 2 is a fan 13, consisting of a number of horizontal strips secured to spokes which are rigidly connected to a shaft 14, one end of which has a bearing in the tubular shaft 7 and the other end has a bearing in the cross-piece 15 at the outlet end of the machine. Fixed to the outer end of the shaft 14 is a pulley 16, to which a band 17 passes to engagement with a pulley 18 on a shaft of two of the alined rollers 4.

Below the hopper 10 is a downwardly and inwardly inclined deflecting-board 19, and attached to the cross-piece 15 at the outlet end of the machine is a circular and downwardly extending stop-plate 20, there being a space between this stop-plate and the lower portion of the cylinder for the discharge of curd.

In operation the curd is to be placed in the hopper 10 and the cylinder 2 is to be rapidly rotated, which will cause a rotation of the fan 13 in the cylinder. The curd will be pressed through the openings 11 and passed into the cylinder, and owing to the incline of the cylinder will move the outlet end. During this movement it will be thoroughly agitated and cooled to the proper temperature by means of the fan-blast. This fan-blast will also remove any impurities or gases that may be contained in the curd.

Having thus fully described my invention, I claim as new and desire to secure by Letters Patent—

1. A curd-aerating device, comprising a cylinder mounted to rotate, a hopper at one end of the cylinder and having openings through its bottom wall for the passage of material, a tubular shaft at one end of the cylinder and extended through the hopper, a spider connecting the tubular shaft to the cylinder, fingers on said tubular shaft for pressing material through the openings in the bottom of the hopper, a fan-shaft having a bearing in the tubular shaft, a fan on said shaft, and means for rotating the fan, substantially as specified.

2. A curd-aerating device, comprising a cylinder mounted to rotate, a hopper arranged at one end of a cylinder and having openings in its bottom wall, a tubular shaft extended through the hopper and connected to the cylinder, a pulley on the outer end of said tubular shaft, fingers on said tubular shaft for forcing material through the openings in the bottom of the hopper, a fan arranged in the cylinder one end of its shaft having a bearing in the tubular shaft, rollers on which the cylinder is mounted to rotate, a band connection between the shaft of alined rollers and the shaft of the crank, a deflective plate extended into the cylinder below the hopper and the retarding-plate at the outlet end of the cylinder, substantially as specified.

CHARLES J. MOORE.

Witnesses:
WM. STEWART,
A. S. WATERMAN.